United States Patent [19]

Peter et al.

[11] Patent Number: 4,852,243
[45] Date of Patent: Aug. 1, 1989

[54] TOOL CHANGER FOR DRILL PRESS

[75] Inventors: Gerhard Peter, Bielefeld; Heinz Kempkensteffen, Rietberg; Rudolf Heid, Lutterbach, all of Fed. Rep. of Germany

[73] Assignee: IMA-NORTE Maschinenfabriken Klessmann GmbH & Co., Fed. Rep. of Germany

[21] Appl. No.: 194,144

[22] Filed: May 16, 1988

[30] Foreign Application Priority Data

May 21, 1987 [DE] Fed. Rep. of Germany ....... 3717016

[51] Int. Cl.$^4$ ............................................. B23Q 3/157
[52] U.S. Cl. ...................................................... 29/568
[58] Field of Search .................. 29/568, 264; 414/749

[56] References Cited

U.S. PATENT DOCUMENTS 4,414,732 11/1983 Tomita et al. .......................... 29/568
4,430,717 2/1984 Senda et al. ....................... 29/568 X

FOREIGN PATENT DOCUMENTS 238758 9/1986 Fed. Rep. of Germany ........ 29/568
53138 3/1984 Japan ..................................... 29/568
76936 5/1985 Japan ..................................... 29/568
1007907 3/1983 U.S.S.R. ................................ 29/568

Primary Examiner—William Briggs
Attorney, Agent, or Firm—Charles E. Baxley

[57] ABSTRACT

An apparatus that machines a workpiece with any of a plurality of tools of different lengths and comprises a generally stationary frame adapted to support the workpiece at a working station, a vertically displaceable drive unit on the frame, a spindle fixed to the drive unit and centered on and rotatable by the drive unit about an upright spindle axis passing through the working station, and a chuck fixed on the spindle and adapted to hold a one of the tools for machining the workpiece held on the frame. A tool-changing apparatus comprises a holder for a plurality of the tools fixed to and vertically displaceable jointly with the drive unit and displaceable to move the tools through a transfer station spaced above the chuck by a predetermined distance and a pair of vertically independently displaceable like grippers fixed together for joint pivoting about a gripper axis between the transfer station and the chuck. The grippers are diametrally opposite relative to the gripper axis and are each positionable in the transfer station and under the chuck. An actuator is provided for vertically displacing the grippers independently of each other between a lower position level with the tool in the chuck and an upper position level with the tool in the transfer station and for pivoting the grippers jointly through substantially 180° between a position in the transfer station and a position aligned with the chuck.

9 Claims, 2 Drawing Sheets

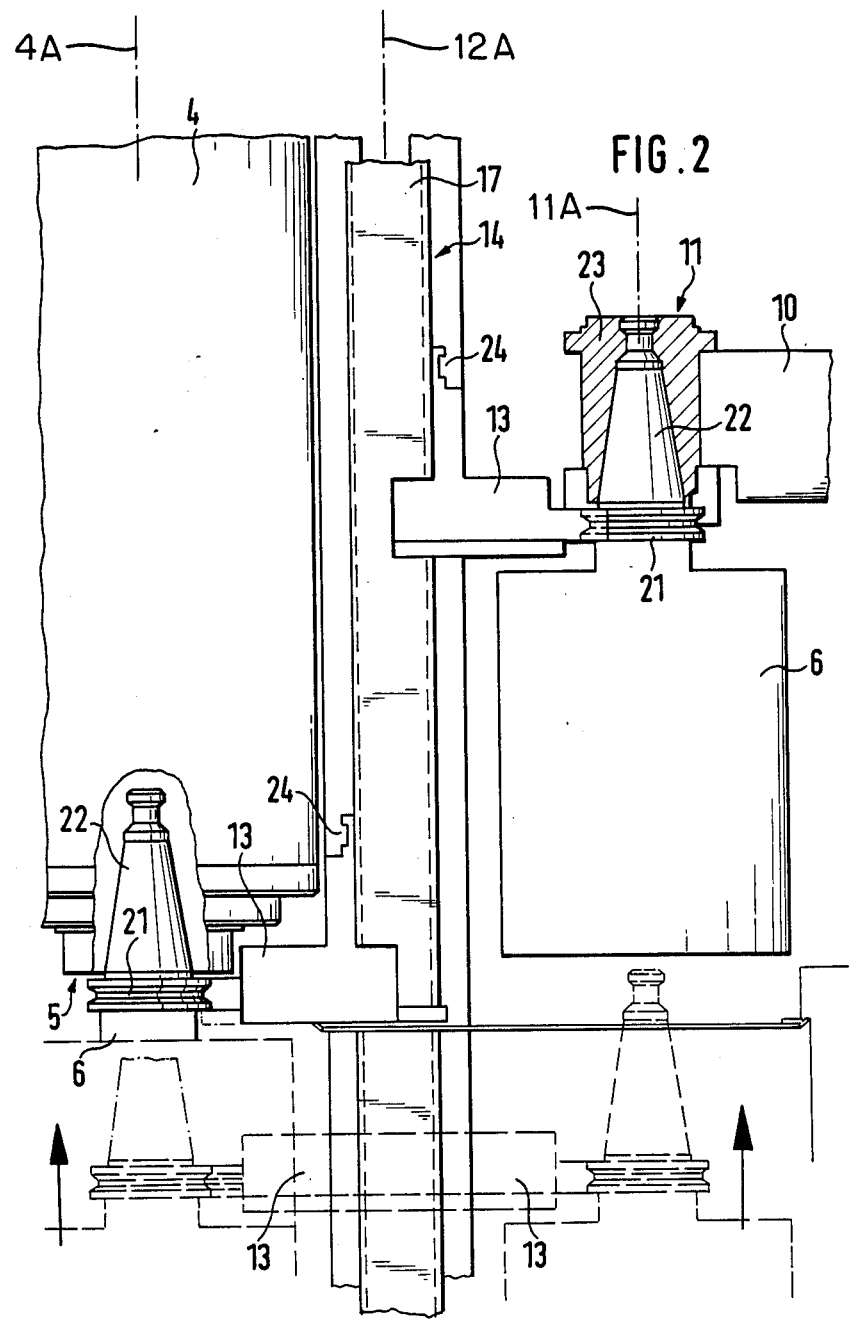

TOOL CHANGER FOR DRILL PRESS

FIELD OF THE INVENTION

The present invention relates to a method of and apparatus for changing tools in a rotary machining apparatus such as a drill press, shaper, or the like. More particularly this invention concerns an automatic tool changer for use in a production line.

BACKGROUND OF THE INVENTION

In a rotary machining tool used for boring, shaping, or the like it is standard to mount the tool changer on the back of the machine, an arrangement that substantially complicates the movements for tool changing and that also makes the machine more expensive. Similarly providing the changer on the side of the apparatus necessitates a transfer device between the changer and the chuck of the spindle that can only operate when the chuck is moved into a special transfer position.

In another known arrangement the tool magazine is mounted between two columns of the machine frame centrally in the machine and the entire magazine is moved into a position aligned with the spindle of the machine. When thus positioned a tool can be taken out of the chuck by the magazine, then another moved into place and put into the chuck. In this arrangement also, however, the spindle must move with the chuck into an intermediate transfer position, one that is relatively far from its working position. In this intermediate position the chuck must be lifted sufficiently to clear even the longest tool that might be mounted in it, so that as a rule the spindle is moved into its uppermost position for such tool changing. Moving up and down between this high position and the working position wastes considerable time, adding to delays in a production line where such a rotary machine with automatic tool changing is typically used.

Yet another system mounts the tool magazine on the vertically displaceable spindle. Thus in theory in any position of the spindle it is possible to change tools. Since the magazine must be concentric to the axis of the tool spindle, with the tools hanging from it, substantial space must be provided to accommodate tools of different lengths. In addition it is necessary to provide a separate pivotal transfer device for each tool, and roller bearings rotatably support each of these transfer devices. The changing device is therefore very expensive, and special tools must be used with it, so that the entire system is extremely costly.

OBJECTS OF THE INVENTION

It is therefore an object of the present invention to provide an improved rotary machining apparatus with an automatic tool changer.

Another object is the provision of such a rotary machining apparatus with an automatic tool changer which overcomes the above-given disadvantages, that is which is of simple and inexpensive construction and that also does not require the tool spindle to follow a long vertical stroke to change tools.

A further object is to provide such an improved rotary machining apparatus whose changer is out of the way, that is not taking up any usable space in the work area.

SUMMARY OF THE INVENTION

The system of this invention works in combination with an apparatus that machines a workpiece with any of a plurality of tools of different lengths and that comprises a generally stationary frame adapted to support the workpiece at a working station, a vertically displaceable drive unit on the frame, a spindle fixed to the drive unit and centered on and rotatable by the drive unit about an upright spindle axis passing through the working station, and a chuck fixed on the spindle and adapted to hold a one of the tools for machining the workpiece held on the frame. The tool-changing apparatus of this invention comprises a holder for a plurality of the tools fixed to and vertically displaceable jointly with the drive unit and displaceable to move the tools through a transfer station spaced above the chuck by a predetermined distance and a pair of vertically independently displaceable like grippers fixed together for joint pivoting about a gripper axis between the transfer station and the chuck. The grippers are diametrally opposite relative to the gripper axis and are each positionable in the transfer station and under the chuck. An actuator is provided for vertically displacing the grippers independently of each other between a lower position level with the tool in the chuck and an upper position level with the tool in the transfer station and for pivoting the grippers jointly through substantially 180° between a position in the transfer station and a position aligned with the chuck.

Thus the system of this invention uses only a single double-gripper transfer device, but moves this device vertically so that the chuck itself need not move into an out-of-the-way transfer position. The particular advantage of this arrangement is that it is possible to hang a group of tools of different lengths in a carousel-type magazine immediately adjacent the work station, but elevated just enough to provide clearest for the longest tool. In fact according to this invention the predetermined distance by which the transfer station or location is spaced above the chuck is generally equal to the difference in vertical length between the shortest of the tools and the longest of the tools. The transfer device travels this distance, allowing the chuck to remain in a relatively low position and also allowing the magazine to be spaced the bare minimum above this distance to avoid hitting the workpiece with a long tool during tool exchange.

According to this invention the apparatus has a vertical guide along which the grippers are vertically displaceable. This guide can be a vertical guide shaft formed with vertically extending formations and the grippers can have complementary formations rotationally linking the shaft and the grippers, the actuator means being connected to the shaft for rotating same about its axis. In addition the guide can comprise for each gripper at least one vertical shaft offset from the guide shaft and passing through the respective gripper.

In the system of this invention one of the grippers is therefore pulling a tool down out of the chuck through a relatively short distance sufficient to pull the collet-type taper out of the chuck while the other gripper is moving the next tool to be used a substantially greater distance down from the transfer station into a lower position exactly level with the extracted tool. Then the grippers are jointly pivoted to reverse the positions of these two tools. Subsequently the tool under the chuck is moved up a short distance to fit it in the chuck while the just extracted tool is moved up through a relatively large distance to fit it into a holder of the magazine. To do this, therefore, the gripper under the transfer station must move faster than the gripper underneath the chuck, something effected by an appropriate control means connected to the actuators for the independently movable grippers.

In order to prevent the extra mass of the magazine from canting the spindle unit it is mounted on and with which it moves vertically, the frame of the machine can be built portal-fashion with the magazine between the two columns or legs of the frame.

DESCRIPTION OF THE DRAWING

The above and other objects, features, and advantages will become more apparent from the following, reference being made to the accompanying drawing in which:

FIG. 2 is a larger-scale and partly sectional view of a detail of the apparatus.

SPECIFIC DESCRIPTION

Figure 1:
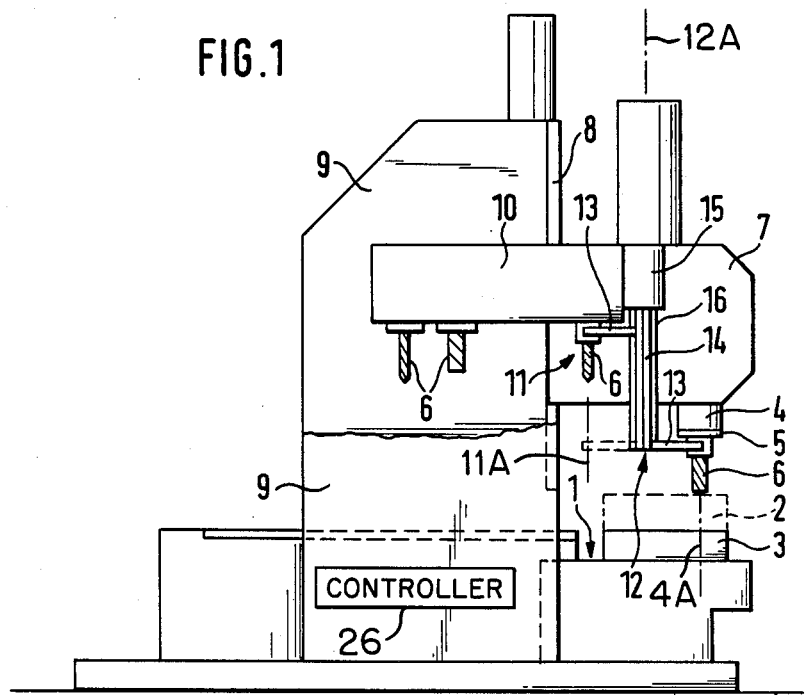
FIG. 1 is a small-scale side view of the apparatus according to this invention.

As seen in FIG. 1 a drill press/shaper according to the invention has a table 1 on which a workpiece 2 is held in a specialty pallet 3 beneath a spindle 4 rotatable about a vertical axis 4A. A chuck 5 on the spindle 4 holds one of several rotary tools 6 that can drill into, shape, or otherwise machine the workpiece 2. The spindle 4 is carried on a drive unit 7 that can move axially vertically along a guide 8 on an upright 9. Two such uprights 9 can be provided, portal-fashion, with the spindle drive unit 7 between them.

Fixed on the drive unit 7 is a magazine unit 10 that can move all of the tools 6 that are not in the chuck 5 through a transfer station 11 adjacent the spindle 4. The tools 6 in the station 11 depend from the magazine 10 and are aligned with an axis 11A offset horizontally from the spindle axis 4A and, in order to prevent the tool 6 in the station 11 from bumping the workpiece 2, are spaced above the tool 6 in the chuck 5 by a distance equal to the difference in length between the shortest tool 6 and the longest tool 6. In the portal system with two frames 9 the magazine 10, which is basically constructed as a carousel whose periphery has a succession of identical workpiece holders, lies between the two frames 9.

A tool 6 is transferred from the chuck 5 to the station 11 and vice versa by means of a transfer device 12 having a pair of identical grippers 13 which are diametrically opposite one another relative to an axis 12A parallel to and equidistant between the axes 4A and 11A. The device 12 can be vertically displaced by an actuator 14 and can be pivoted about its axis 12A by another actuator 15 through 180° to each of the grippers 13 with either of the axes 4A or 11A.

As seen in FIG. 2 the grippers 13 can be moved independently of one another by engagement of the actuator 14 in notches 24 so as to engage the grippers 13 in collars 21 formed below a tapered shaft 22 of each tool 6. In the station 11 the tapers 22 are held in fittings 23 in the carousel magazine 10.

Figure 3:
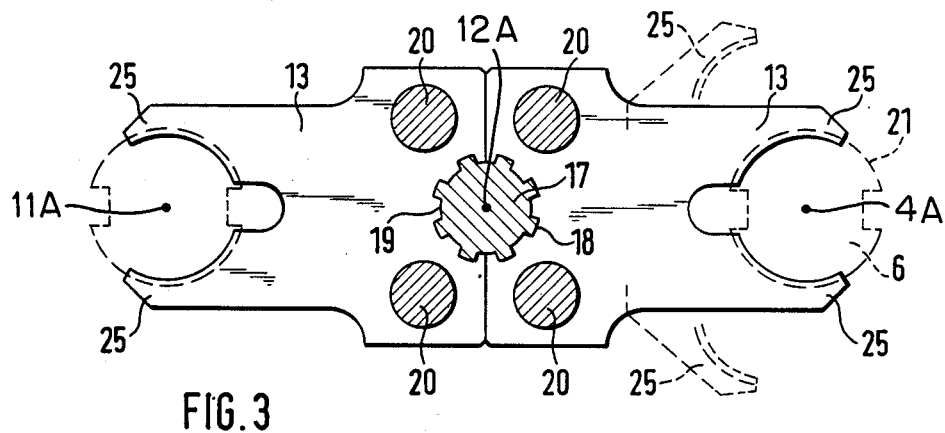
FIG. 3 is a partly sectional top view of a detail of the structure of FIG. 2.

As seen in FIG. 3 each of the grippers 13 has a pair of spreadable jaws 25 operated by an actuator itself run by a controller 26 which is shown schematically in FIG. 1 and which is also connected to the various actuators 15 and 16 to synchronize the operations described in greater detail below. The guide 14 comprises a vertical shaft 17 centered on the axis 12A and formed with splines 18 that engage in notches 19 of the grippers 13, and adjacent parallel guide rods 20 of circular section are provided to guide the grippers 13.

The device operates as follows:

To change a tool 6 in the chuck 5 with another tool held in one of the holders 23 of the carousel/magazine 10 at the station 11, one of the grippers 13 is lowered by the actuator 14 down to the level of the tool 6 in the chuck 5 and the other gripper 13 is similarly moved to the level of the tool 6 in the station 11 and both grippers 13 close on the respective tools 6. Then the two grippers 13 both move downward sufficiently to pull the tool 6 in the chuck 5 just clear of this chuck 5 and to move the other grasped tool 6 down to the same level. This operation takes place in the same time so that the gripper 13 holding the tool 6 on the axis 11A must move more rapidly than the other gripper 13 since it must cover a greater distance.

Then the entire transfer device 12 is rotated by the actuator 15 through 180° reverse the positions of the tools 6 and then the tool 6 on the axis 4A is moved up and fitted to the chuck 5 while the other tool 6 is raised a substantially greater distance, of course at a greater speed, and is fitted to the recently vacated holder 23, although it is possible that meanwhile the carousel 11 has rotated to move another such holder 23 into position to receive this tool 6.

We claim:

1. In combination with an apparatus that machines a workpiece with any of a plurality of tools of different lengths and that comprises:
   a generally stationary frame adapted to support the workpiece at a working station;
   a vertically displaceable drive unit on the frame;
   a spindle fixed to the drive unit and centered on and rotatable by the drive unit about an upright spindle axis passing through the working station; and
   a chuck fixed on the spindle and adapted to hold a one of the tools for machining the workpiece held on the frame;
   a tool changing apparatus comprising:
   a holder for a plurality of the tools fixed to and vertically displaceable jointly with the drive unit and displaceable to move the tools through a transfer station spaced above the chuck by a predetermined distance equal generally to the difference in vertical length between the shortest of the tools and the longest of the tools;
   a pair of vertically independently displaceable like grippers fixed together for joint pivoting about a gripper axis between the transfer station and the chuck, the grippers being diametrally opposite relative to the gripper axis and each being positionable in the transfer station and under the chuck;
   actuator means for vertically displacing the grippers independently of each other between a lower position level with the tool in the chuck and an upper position level with the tool in the transfer station and for pivoting the grippers jointly through substantially 180° between a position in the transfer station and a position aligned with the chuck.

2. A method of changing tools in an apparatus that machines a workpiece with any of a plurality of tools of different lengths and that comprises:

a generally stationary frame adapted to support the workpiece at a working station;

a vertically displaceable drive unit on the frame;

a spindle fixed to the drive unit and centered on and rotatable by the drive unit about an upright spindle axis passing through the working station; and a chuck fixed on the spindle and adapted to hold a one of the tools for machining the workpiece held on frame; the method comprising the steps of:

hanging the plurality of tools from a magazine with one of the tools at a transfer station spaced above the chuck by a predetermined distance;

displacing a pair of grippers vertically independently of one another between lower positions level with the tool in the chuck and upper positions level with the transfer station;

pivoting the grippers jointly about a gripper axis between the transfer station and the chuck through about 180° between a position with one of the grippers aligned with the tool in the transfer station and the other gripper aligned with the tool in the chuck and another position with the one gripper aligned with the tool in the chuck and the other tool aligned with the tool in the transfer station;

opening and closing the grippers on the tools in the station and chuck; and synchronizing vertical displacement and pivoting of the tools with opening and closing of the tools to pull a tool down out of the chuck while pulling a tool down out of the transfer station until both tools are at the same level, then pivoting the grippers jointly to reverse positions of the tools, then displacing the grippers upward to place the tools in the chuck and magazine, the gripper moving beneath the transfer station more rapidly than underneath the chuck.

3. The apparatus defined in claim 1, further comprising
a vertical guide along which the grippers are vertically displaceable.

4. The apparatus defined in claim 3 wherein the guide is a vertical guide shaft formed with vertically extending formations and the grippers have complementary formations rotationally linking the shaft and the gripper, the actuator means being connected to the shaft for rotating same about its axis.

5. The apparatus defined in claim 4 wherein the guide further includes for each gripper at least one vertical shaft offset from the guide shaft and passing through the respective gripper.

6. An apparatus for machining a workpiece with any of a plurality of tools of different lengths, the apparatus comprising:

a generally stationary frame adapted to support the workpiece at a working station;

a vertically displaceable drive unit on the frame;

a spindle fixed to the drive unit and centered on and rotatable by the drive unit about an upright spindle axis passing through the working station;

a chuck fixed on the spindle and adapted to hold a one of the tools for machining the workpiece held on the frame;

a magazine carrying a plurality of the tools, fixed to and vertically displaceable jointly with the drive unit, and displaceable to move the tools through a transfer station spaced above the chuck by a predetermined distance, the tools hanging from the magazine and extending generally parallel to the spindle axis;

a pair of vertically independently displaceable like grippers fixed together for joint pivoting about a gripper axis generally parallel to the spindle axis between the transfer station and the chuck, the grippers being diametrally opposite relative to the gripper axis and each being positionable in the transfer station and under the chuck and closable on a tool therein; and actuator means for vertically displacing the grippers independently of each other between a lower position level with the tool in the chuck and an upper position level with the tool in the transfer station and for pivoting the grippers jointly through substantially 180° between a position in the transfer station and a position aligned with the chuck for transferring tools between the chuck and station while maintaining the tools generally parallel to the axis.

7. The apparatus defined in claim 6, further comprising
a vertical guide along which the grippers are vertically displaceable.

8. The apparatus defined in claim 7 wherein the guide is a vertical guide shaft formed with vertically extending formations and the grippers have complementary formations rotationally linking the shaft and the grippers, the actuator means being connected to the shaft for rotating same about its axis.

9. The apparatus defined in claim 8 wherein the guide further includes for each gripper at least one vertical shaft offset from the guide shaft and passing through the respective gripper.

* * * * *